Figure 4:
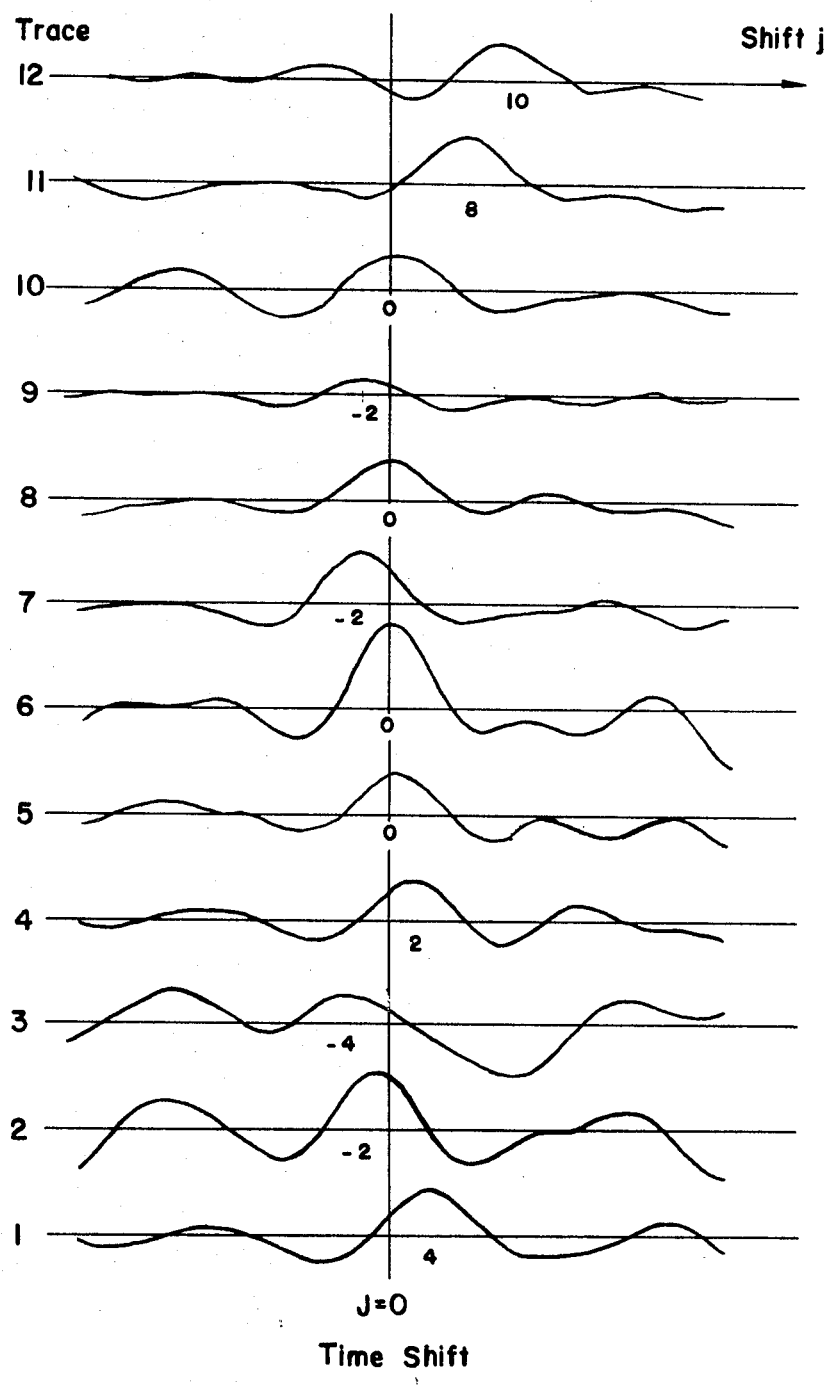

United States Patent

Sengbush

[15] 3,648,227
[45] Mar. 7, 1972

[54] CORRECTING SEISMIC TRACES FOR STATIC CORRECTIONS AND NORMAL MOVEOUT

[72] Inventor: Raymond L. Sengbush, 1209 Plattner Drive, Grand Prairie, Tex. 75050

[22] Filed: Oct. 25, 1966

[21] Appl. No.: 589,463

Related U.S. Application Data

[63] Continuation of Ser. No. 329,503, Dec. 10, 1963, abandoned.

[52] U.S. Cl. ................................................. 340/15.5 TD
[51] Int. Cl. ....................................................... G01v 1/36
[58] Field of Search ................. 340/15.5, 15.5 TC, 15.5 TD

[56] References Cited

UNITED STATES PATENTS

| | | | |
|---|---|---|---|
| 2,229,191 | 1/1941 | Shaeffer et al. | 181/.5 C |
| 2,321,450 | 6/1943 | Athy et al. | 181/.5 C |
| 3,075,607 | 1/1963 | Aitken et al. | 181/.5 C |

Primary Examiner—Rodney D. Bennett, Jr.
Assistant Examiner—Daniel C. Kaufman
Attorney—William J. Scherback

[57] ABSTRACT

A technique for obtaining static corrections and normal moveout for a set of seismic traces. The total time shifts between all traces and a reference trace are obtained by cross-correlation. The total time shift includes the components of normal moveout, dip, and static correction. The known static corrections and the total time shifts for both end traces are combined to compute the dip and normal moveout corrections for the end traces. Dip and normal moveout for the end traces are extrapolated for dip and normal moveout for each individual trace. The static correction for each trace is obtained by subtracting the values of dip and normal moveout for each trace from the total time shift for each trace. In this manner, all of the corrections required to reduce a set of seismic traces to a common reference may be obtained.

15 Claims, 15 Drawing Figures

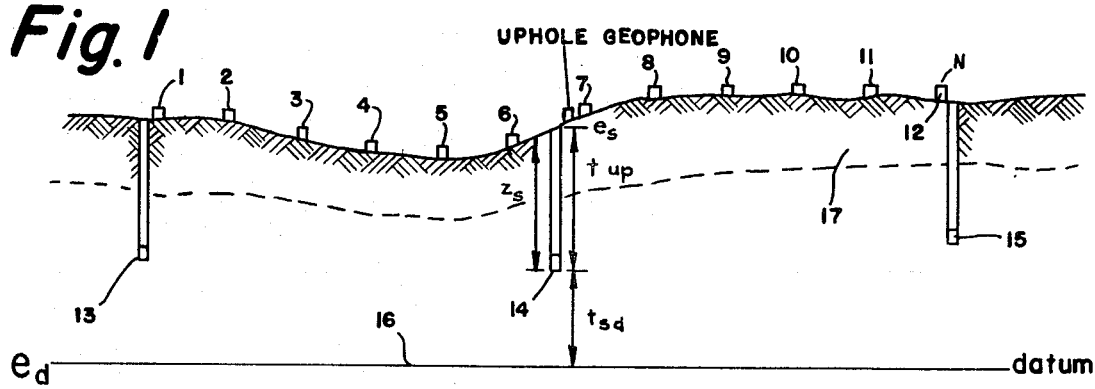
Fig. 1
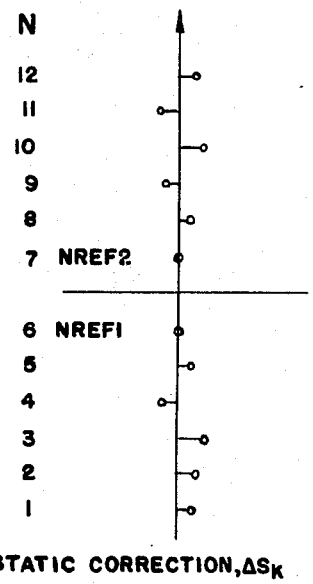
STATIC CORRECTION, $\Delta S_K$
Fig. 2a
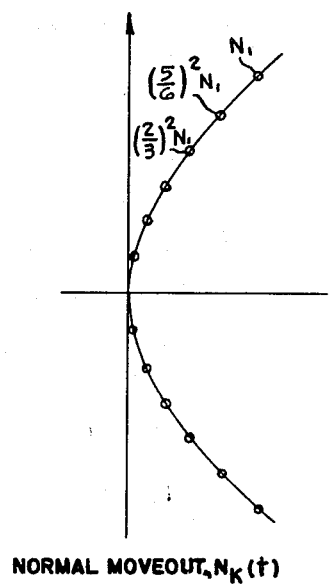
NORMAL MOVEOUT, $N_K(t)$
Fig. 2b
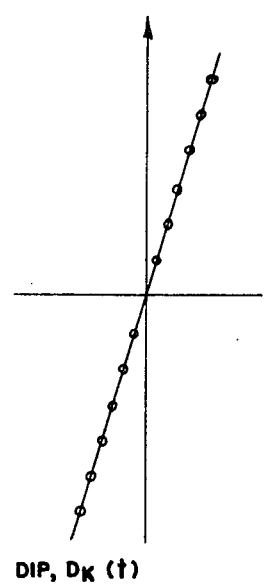
DIP, $D_K(t)$
Fig. 2c
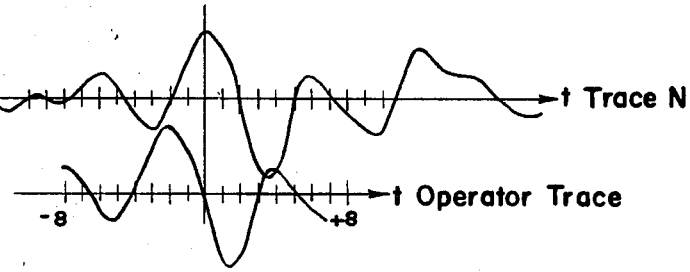
Fig. 3a — t Trace N
Fig. 3b — t Operator Trace
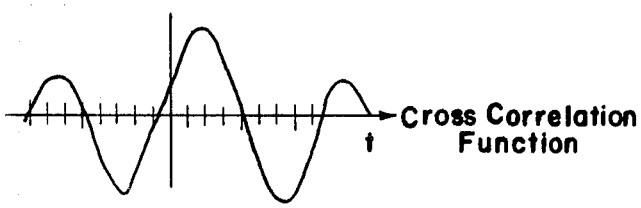
Fig. 3c — Cross Correlation Function
Time Shift

CORRECTING SEISMIC TRACES FOR STATIC CORRECTIONS AND NORMAL MOVEOUT

This application is a continuation of application Ser. No. 329,503, filed Dec. 10, 1963, now abandoned.

This invention relates to methods of automatically performing seismic correction calculations and, more particularly, to a method of using digital cross-correlation techniques to establish the most probable dip of reflections on a seismic record.

After a seismic survey of a given area has been completed, topographical subsurface maps are constructed and from the contours of the subsurface strata valuable deductions can be made with respect to the probability of the presence of oil or other deposits. In order to determine the topographic character of the subsurface strata, it is necessary to determine its dip or slope. Heretofore, and because of the associated corrections required, the determination of the dip of a reflecting region or interface between two strata has required extensive, time-consuming operations.

In making a seismic survey, the common practice is to obtain a plurality of seismic records from geophones spaced apart from a shot point at which a charge of dynamite creates a disturbance which is reflected from subsurface strata and detected at the geophones. Certain important corrections must be applied to the seismic traces produced at each of the geophones.

First, each of the traces must be corrected for what is commonly referred to as normal moveout. The travel time of the seismic wave from the shot point to the geophone differs in accordance with the differing spacing of the geophones from the shot point. To correct for this, a normal moveout correction which is related to the distance from the shot point to the associated geophone is applied to each trace.

In addition, what is commonly referred to as a static correction must be applied to each trace. Each of the geophones is located at the surface and may be at varying elevations with respect to the shot point. Also, the top portion of the earth's crust, referred to as the weathering layer, has varying velocity characteristics and thickness from place to place which introduces an unknown time shift into each trace. Therefore, each seismic trace is corrected to a datum plane that is normally located at a selected distance below the shot point. In this manner, each seismic trace contains reflections which occur at a time as if the shot and each geophone had been located at the datum plane.

After each of the above corrections has been made, the time occurrences of the reflections on each of the seismic traces may be utilized to indicate the dip of the subsurface strata which gives rise to the reflections.

In accordance with one aspect of my invention, the above corrections are automatically computed by a technique which includes a cross-correlation between an operator selected from a reference trace and the trace which is to be corrected. The operator consists of a short segment of the reference trace that contains one or more good reflections. The reflection segment which has been picked, referred to as the operator, is then used to obtain the total time difference between the reference trace and all other traces by means of a cross-correlation technique. Once the total time difference between each trace and the reference trace is obtained, it is possible to obtain the normal moveout and static corrections for each trace.

This is done by first calculating the differential static correction for the trace associated with a detector at the end of the geophone spread. The static correction for this end detector is known because it is adjacent a shot point. (The differential static correction is the difference between the static correction for the reference trace and the static correction for the trace associated with any one of the detectors.) Normally, an uphole detector is located at the shot point and the direct path travel time from the shot to this uphole detector may be used to determine the static correction at the shot point. Normally, another shot point is located at the other end of the geophone spread. Therefore, the static correction can also be determined for the trace from the detector located adjacent this shot point. The traces associated with these shot points are referred to as the end traces. Having obtained the static corrections for the end traces from uphole information, and having obtained the total time difference for each end trace with respect to the reference trace, it is possible to determine the normal moveout correction for each end trace.

The normal moveout corrections for the end traces are then extrapolated to obtain the normal moveout correction for the other traces between the two end traces. This is possible because the normal moveout is related to the spacing between the geophones, which is known.

Similarly, the dip for each end trace can be obtained from the known static correction and total time difference for the end traces. Assuming the dip is linear between the two end geophones, the dip for each of the center traces is obtained by extrapolating the dip for the end traces to the center traces. This is possible because the dip for each center trace also is directly related to the spacing between the geophones which is known.

From the total time correction for each trace, obtained by the cross-correlation, and the dip and the normal moveout for each trace, obtained by extrapolation, the static correction for each trace can be obtained. Then, each record trace is finally corrected by applying the normal moveout and the static correction to the trace. This leaves each trace with the dip information still contained in the record.

In this manner, each seismic record is automatically corrected for normal moveout, elevation differences, and weathering.

Figure 4A:
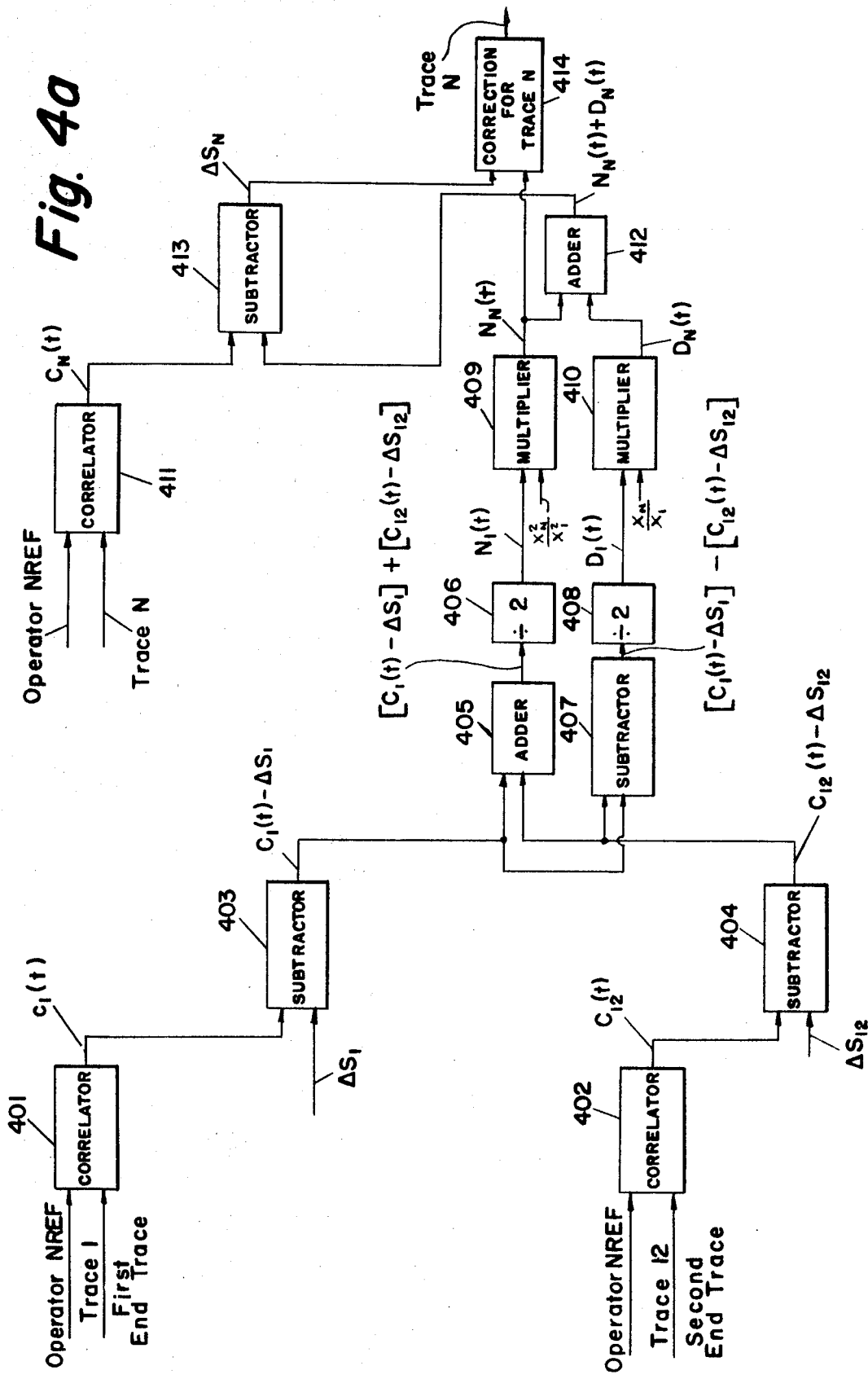
Figure 5:
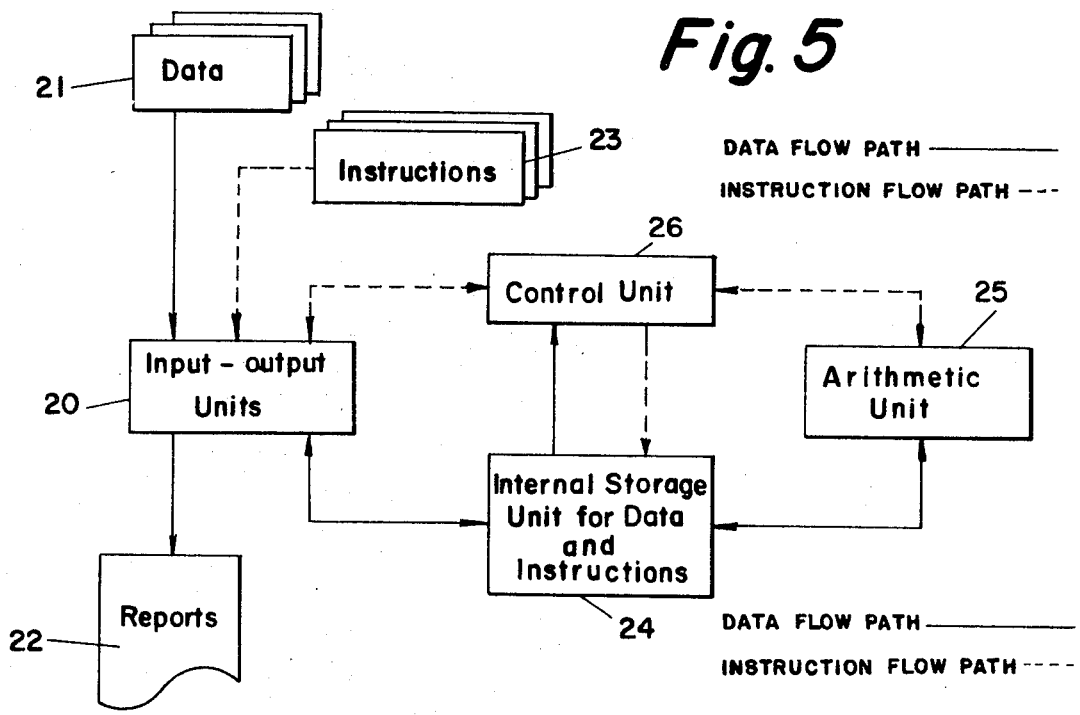
Figure 6:
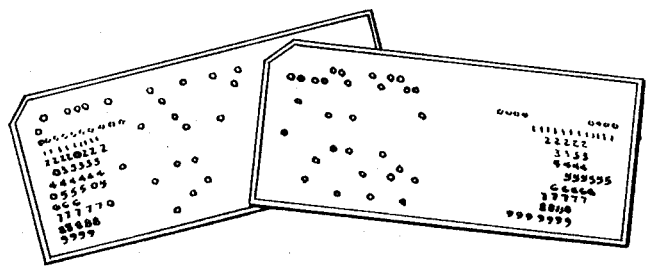
Figure 7:
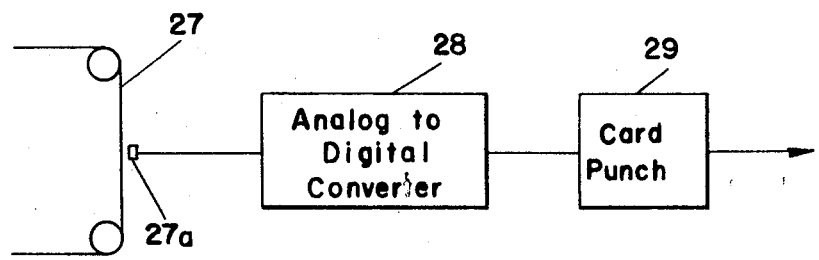
Figure 8:
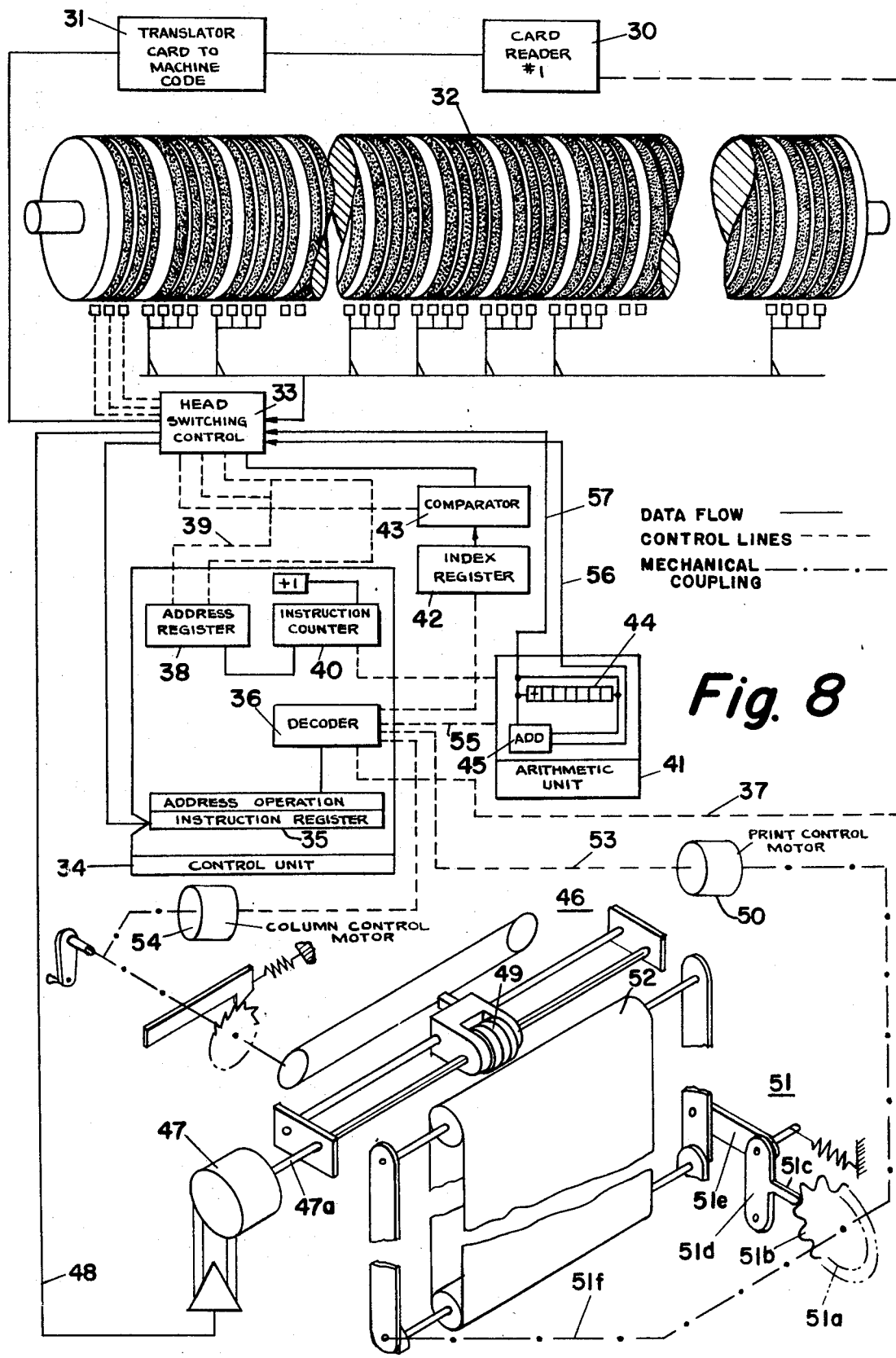
Figure 9:
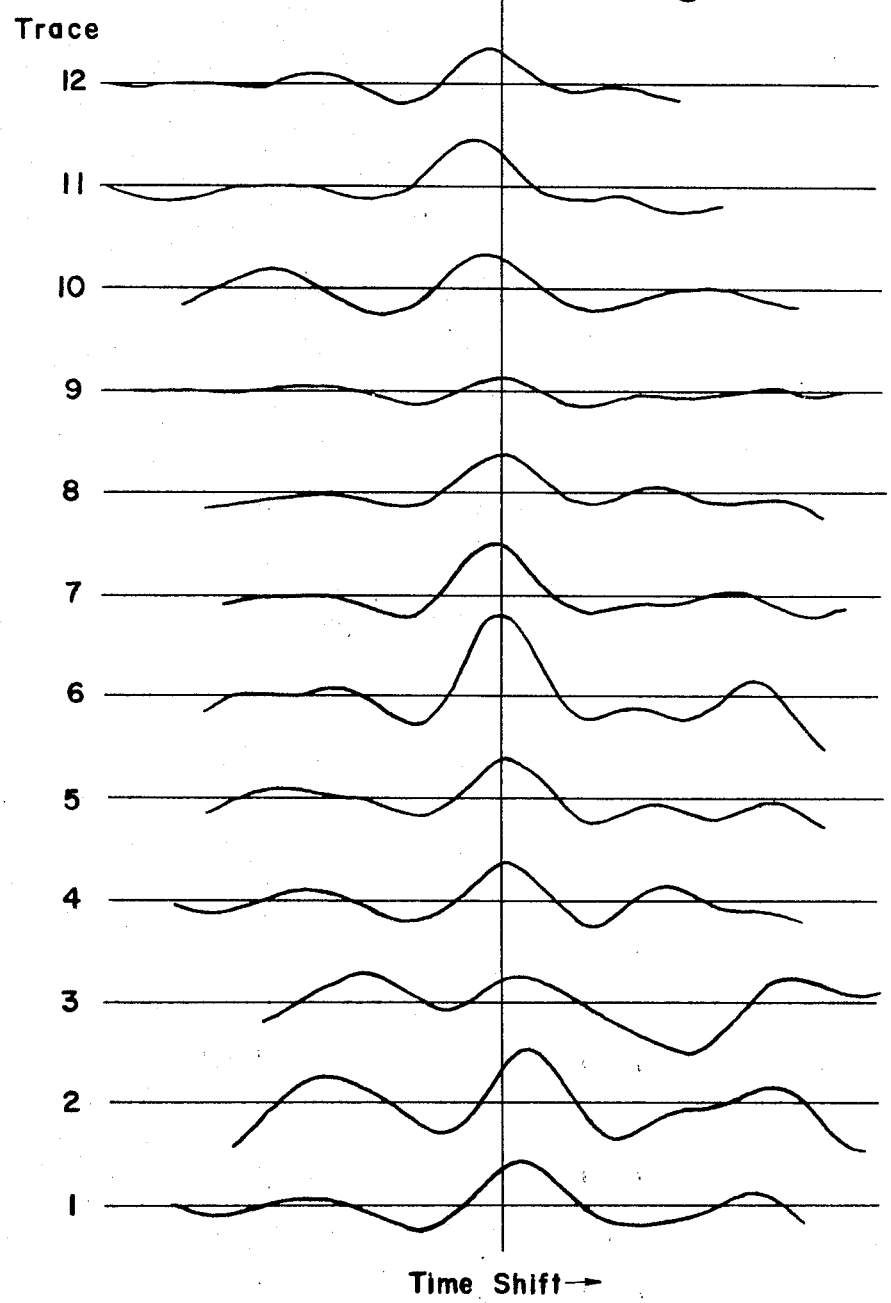
Figure 10:
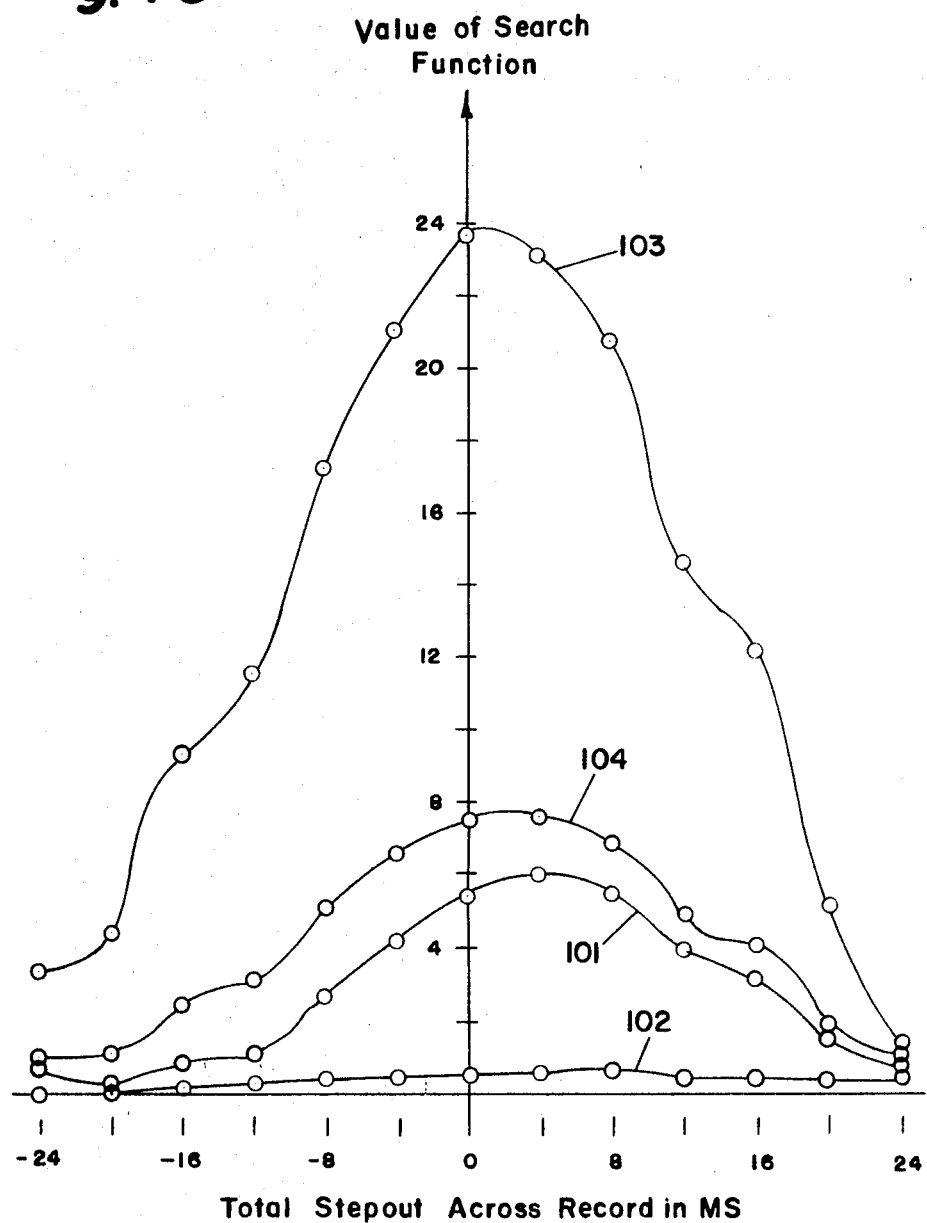

The foregoing and other objects, features and advantages of the present invention will be better understood from the following more detailed description in conjunction with the appended drawings in which:

FIG. 1 shows an array of shotholes and detectors;
FIG. 2a shows the static corrections applied to 12 traces;
FIG. 2b shows the normal moveout correction to the same 12 traces;
FIG. 2c shows the dip indicated by the same 12 traces;
FIG. 3a shows a portion of a seismic trace;
FIG. 3b shows an operator portion from a seismic trace;
FIG. 3c shows the cross-correlation function of the trace and the operator;
FIG. 4 shows the correlation function for 12 traces;
FIG. 4a shows the invention in block form;
FIG. 5 is a block diagram of a digital data-processing system;
FIG. 6 shows typical punchcards;
FIG. 7 shows apparatus for converting seismic data from magnetic tapes to punched cards;
FIG. 8 shows a digital data-processing system;
FIG. 9 shows the cross-correlation functions of 12 corrected traces; and
FIG. 10 is a plot of the dip search function.

The corrections which are applied to the records will now be explained in conjunction with the geophone spread shown in FIG. 1. In FIG. 1 the geophones 1, 2, ..., 9, 10, 11, and 12 are shown. The geophone 12 has also been denoted as the Nth geophone. The reference character N is intended to indicate that any suitable number of geophones may be included in the spread. The character N is used to denote any particular geophone or trace in this specification.

Also shown in FIG. 1 are the shotholes 13, 14, and 15. In a seismic survey in which the method of shooting referred to as split continuous is employed, geophones are first spaced to the left and to the right of the shothole 13. (The geophones to the right of the shot hole and denoted 1–6 are shown in FIG. 1.) A shot is then detonated in the shothole 13 to produce a series of seismic record traces produced by each of the geophones. Next, the geophones are rearranged so that geophones are spaced on the left and on the right of the shothole 14, as shown in FIG. 1. The shot in the shothole 14 is then detonated to produce another plurality of seismic record traces. The geophone spread is then rearranged so that geophones are spaced to the left and to the right of shothole 15. The seismic survey continues in this manner. Because of this, the static corrections associated with the geophones at the shotholes are known. However, it is necessary to obtain the static corrections for the geophones, such as 2, 3, 4, and 5, which are spaced between the shotholes.

This static correction corrects the seismic record to the datum plane 16. After making this correction, the reflection times on each trace are the reflection times which would have been obtained if the shot and the geophones had all been located at the datum plane 16. This removes the effects of the near surface irregularities introduced by the weathering layer 17 and also removes the effects of the different elevations of the shots and the geophones.

The static time correction that is applied to the traces adjacent to the shot point is designated $T_c$. This is the time required for the seismic wave to travel from the bottom of the shothole to the datum plane and back to the uphole geophone located directly adjacent to a shothole. The correction $T_c$ is given by:

$$T_c = t_{up} + 2t_{sd} \qquad (1)$$

where:

$t_{up}$ is the uphole time obtained from the field record; and $t_{sd}$ is the calculated time of travel between the shot and the datum plane.

The correction $T_c$ can be split up into the travel time from shot to datum, $t_{sd}$, and the travel time from geophone to datum, $t_{gd}$, which is equal to $t_{up} + t_{sd}$. The correction $t_{sd}$ has the effect of moving the shot to the datum plane. This correction applies to each trace on the record. The correction $t_{gd}$ has the effect of moving each geophone to the datum plane. Generally, $t_{gd}$ has a different value for each geophone location. The shot to datum time, $t_{sd}$, can be obtained from the following equation:

$$(2) \qquad t_{sd} = \frac{(e_s - z_s) - e_d}{v_{sw}}$$

where:

$e_s$ is the elevation of the shot point above a reference;

$z_s$ is the depth of the shot;

$e_d$ is the elevation of the datum plane above a reference; and $v_{sw}$ is the average velocity in the subweathering.

The subweathering velocity is obtained from uphole shooting.

Combining equations (1) and (2), the static time correction to be applied to the trace from the geophone adjacent to the shothole 14 is given by:

$$(2a) \qquad T_c = t_{up} - 2 \frac{(e_s - z_s) - e_d}{v_{sw}}$$

For all other traces the static correction to be applied is given by $T_c$ plus a differential static correction that compensates for differences in elevation and weathering at the geophone compared to the shot point. This correction is denoted $\Delta S_N$, where N is the trace number; i.e., $\Delta S_2$ is the differential static correction applied to the trace obtained from geophone 2 in FIG. 1; and $\Delta S_3$ is the differential static correction applied to the trace obtained from geophone 3 in FIG. 1; and so on. $T_c$ is a static correction that applies to the entire record, while $\Delta S_N$ is a static correction that applies to the Nth trace.

The total time correction at a particular time $t$ on the Nth trace is $T_c + C_N(t)$, where $C_N(t)$ is the sum of three different components as follows:

1. Differential static correction, $\Delta S_N$
2. Normal moveout, $N_N(t)$
3. Dip, $D_N(t)$ $C_N(t)$ is called the trace time correction. At the time $t$, it is given by:

$$C_N(t) = \Delta S_N + D_N(t) + N_N(t) \qquad (3)$$

It is to be noted that only the dip and the normal moveout are functions of record time. The trace time correction, $C_N(t)$, can be obtained directly from the field record. In accordance with the present invention, the trace time correction is obtained automatically by using digital cross-correlation techniques.

The three components, static, normal moveout, and dip, are shown in FIGS. 2a, 2b and 2c, respectively, for a given record time $t$. It should be noted that $N_N(t)$ is an even function of distance on either side of the reference traces which are considered to be the traces from geophones 6 and 7 in FIG. 1. (The traces from these geophones are denoted NREF1 and NREF2.) That is, the normal moveout for trace 8 equals the normal moveout for trace 5; the normal moveout for trace 9 equals the normal moveout for trace 4; the normal moveout for trace 10 equals the normal moveout for trace 3; and so on. On the other hand, the dip correction is an odd function of distance. The dip correction for trace 7 is equal to the negative of the dip correction for trace 6; the dip correction for trace 8 is equal to the negative of the dip correction for trace 5; and so on. By taking advantage of these properties, and knowing $\Delta S_N$ for the end traces, 1 and 12, it is possible to determine the three components of $C_N(t)$ for all N and for all $t$.

For simplicity, it is assumed that the shot points are equally spaced and that the geophone spacing is constant. The procedure for automatically computing the normal moveout and static corrections for each trace is as follows. As previously mentioned, in split continuous shooting a spread of geophones and shotholes similar to that shown in FIG. 1 is provided. The end traces are obtained from the geophones 1 and 12 which are adjacent the shotholes 13 and 15, respectively. The differential static corrections for the end traces, $\Delta S_1$ and $\Delta S_{12}$ are obtained from the difference between $t_{gd}$ for the end traces and $t_{gd}$ for the reference traces. Since traces from the geophones 1, 6, 7, and 12 are adjacent shotholes, the values of $t_{gd}$ can be computed. The static time correction $t_{gd}$ for each of these traces is obtained in accordance with equation $$(2b) \qquad t_{gd} = t_{up} - \frac{(e_s - z_s) - e_d}{v_{sw}}$$

The static time corrections $t_{gd}$ for traces 6 and 7, denoted NREF1 and NREF2, are then averaged to obtain a reference time correction $t_{gdREF}$. The differential static corrections for the end traces, $\Delta S_1$ and $\Delta S_{12}$ are then obtained by subtracting $t_{gdREF}$ from $t_{gd1}$ and $t_{gd12}$ respectively.

Since $\Delta S_1$ and $\Delta S_{12}$ are known, and since $C_1(t)$ and $C_{12}(t)$ can be obtained by cross-correlation, as will be subsequently explained, the effects of dip and normal moveout at the end traces can be obtained as follows. The total corrections at each end trace are given below:

$$C_1(t) = \Delta S_1 + D_1(t) + N_1(t) \qquad (4)$$
$$C_{12}(t) = \Delta S_{12} + D_{12}(t) + N_{12}(t)$$

Since $D_1(t)$ equals $-D_{12}(t)$ and $N_1(t)$ equals $N_{12}(t)$, the two equations above may be rewritten as:

$$C_1(t) - \Delta S_1 = D_1(t) + N_1(t) \qquad (5)$$
$$C_{12}(t) - \Delta S_{12} = -D_1(t) + N_1(t)$$

Addition of the above equations provides the normal moveout correction and subtraction of the equation gives the dip correction for one end trace.

$$(6) \qquad N_1(t) = \frac{[C_1(t) - \Delta S_1] + [C_{12}(t) - \Delta S_{12}]}{2}$$

$$(7) \qquad D_1(t) = \frac{[C_1(t) - \Delta S_1] - [C_{12}(t) - \Delta S_{12}]}{2}$$

Since $N_1(t)$ equals $N_{12}(t)$ and $D_1(t)$ equals $-D_{12}(t)$, the dip and normal moveout are also known for trace 12.

Since the normal moveout and dip are known for the end traces, the differential static corrections for each of the intermediate traces can be computed. First, the normal moveout for the end trace must be related to the normal moveout for each intermediate trace and the dip for the end trace must be related to the dip for each of the intermediate traces. This is done through use of a parameter $\alpha_N$ defined by:

$$\alpha_N = x_N / x_1 \qquad (8)$$

where:

$x_N$ is the distance and direction from the geophone associated with the reference trace to the Nth geophone; and $x_1$ is the distance from the geophone associated with the reference trace to geophone 1.

The parameter $\alpha_N$ is an odd function in order to preserve direction, i.e., $$\alpha_N = -\alpha_{-N} \quad (9)$$

where:

N is the number of a trace on one side of the shot point; and

−N is the number of the trace on the other side of the shot point.

This is necessary because the dip correction is dependent upon direction. The dip correction on the Nth trace is given by:

$$D_N(t) = P(\alpha_N) D_1(t) \quad (10)$$

In the above, $P(\alpha_N)$ is a polynomial and is an odd function with respect to the center reference trace spread.

The normal moveout correction on the Nth trace is given by:

$$N_N(t) = Q[|\alpha_N|] N_1(t) \quad (11)$$

In the above, $Q[|\alpha_N|]$ is a function of $|\alpha_N|$. The absolute value (indicated by the vertical bars in the foregoing expression) of $\alpha_N$ is used because normal moveout is an even function with respect to the center traces; that is, normal moveout is dependent upon distance only from the reference trace and not direction.

Thus, $\Delta S_N$ is obtained by substituting equations (10) and (11) into the general equation (3) as follows:

$$\Delta S_N = C_N(t) - P(\alpha_N) D_1(t) - Q[|\alpha_N|] N_1(t) \quad (12)$$

As a simple approximation, let $P(\alpha_N) = \alpha_N$ and $Q[|\alpha_N|] = \alpha_N^2$. Then, $$\Delta S_N = C_N(t) - \alpha_N D_1(t) - \alpha_N^2 N_1(t) \quad (13)$$

By following the three steps outlined above, the static correction can be determined for all N and the normal moveout correction can be determined fro all N and for all $t$. This allows us to make a time-corrected record that preserves dip.

The automated time correction technique will now be described in more detail. The value of $C_N(t)$ for a given trace N and a given time $t$ is obtained by cross-correlating a section of one of the center traces with the Nth trace. The resulting cross-correlation function is searched for its maximum value and the associated correlation time gives the total correction $C_N(t_{1a})$.

The term correlation as used in this specification and the appended claims is defined by the mathematical definition of the term as a multiplication of two functions to find the most precise match between the functions.

Referring to FIG. 3a there is shown a portion of trace N, which may be obtained, for example, from geophone 12. This portion of the trace contains one or more reflections from particular reflecting surfaces. FIG. 3b shows a portion of the seismogram obtained from one of the center traces, trace NREF which may be, for example, the trace obtained from geophone 6 or 7. When the cross-correlation between the operator shown in FIG. 3b and the trace shown in FIG. 3a is to be performed digitally, the trace N and the operator NREF are broken up into sampling intervals, shown along the abscissa, and the value of the trace or the operator at each sampling interval is stored. As shown in FIG. 3b, the operator is 16 sampling intervals long. That is, the operator has a length of 16 units or the length of the operator window is 16 units. In the cross-correlation operation, each sample value of the operator NREF is multiplied by the corresponding sample value of the trace N. Since there are 16 sampling intervals in the operator, there are 17 samples. Accordingly, 17 products of the operator samples and the trace samples will be obtained. These products are added together to provide a value of the cross-correlation function. The operator is then shifted by an incremental amount, for example, equal to one sampling interval, and the products of the operator samples and the trace samples are again obtained. These samples are added together and the sum forms a second value of the cross-correlation function. This process continues until the value of the cross-correlation function has been obtained for each interval of time. In FIG. 3c, the cross-correlation function has been plotted as a function of the amount of shift.

It can be seen from FIG. 3c that the maximum correlation function occurs at a shift of two sampling intervals. This is the total time correction between the operator trace NREF, for example, trace 6, and the trace N, for example, trace 12. That this is the total time difference between these two traces, can be seen from an inspection of FIGS. 3a and 3b. These two figures show portions of the seismic record which contain reflections from the same reflecting interfaces. It will be seen that the seismic records are quite similar, except that the trace N, FIG. 3a, lags the operator trace NREF by approximately two sampling intervals. Therefore, the total correction $C_N(t_1)$ is established as two sampling intervals. This may quite easily be converted to a time, since the sampling interval time is known. This establishes one point in the $C_N(t)$ curve. This procedure is repeated for all values of $t$ and for all N traces.

The static corrections $\Delta S_N$ can be computed using equation (12), or (13) if the approximation is appropriate. Since $\Delta S_N$ is independent of time, it is necessary to solve equations (12) or (13) for only one specific time $t_1$. An operator which includes a good reflection should be selected in order to get an accurate value for the differential static correction. Repeating the calculation with a second operator which includes another good reflection will provide a check on the accuracy of the evaluation of $\Delta S_N$.

The normal moveout correction $N_1(t)$ can be computed for all $t$, or for a sufficient number of specific record times to specify the NMO curve. This is accomplished by computing $C_1(t$ and $C_{12}(t)$, the total time correction for the end traces, using cross-correlation, and applying the results to equation (6). $N_N(t)$ is obtained through equation (11), where $Q[|\alpha_N|]$ is determined empirically. Then, knowing $\Delta S_N$ and $N_N(t)$ the traces can be shifted both statically and dynamically to give a time-corrected record with the dip left in.

One example of the calculation of the normal moveout and static corrections for 12 traces such as those shown in FIG. 1, is given below by way of example. In this example it is assumed that $P(\alpha_N)$ equals $\alpha_N$ and $Q[|\alpha_N|]$ equals $\alpha_N^2$. From the uphole information from geophones 1 and 12, the static corrections for the end traces were found to be as follows:

$$\Delta S_1 = -2 \text{ msec.} \quad (15)$$
$$\Delta S_{12} = -11 \text{ msec.}$$

These values for the static corrections for the end traces were obtained in accordance with equation (2a) by using the known uphole times, elevation, and depth of shothole.

The correlation function obtained by correlating an operator from the sixth trace against all of the other traces was obtained. These correlation functions are shown in FIG. 4. It should be understood that the correlation functions will not normally be plotted as in FIG. 4, but rather the times of the maximum correlation will be computed automatically. However, FIG. 4 is useful in showing the time of maximum correlation for each trace. From FIG. 4 it can be seen that:

$$C_1(t_1) = +4 \text{ msec.}$$
$$C_{12}(t_1) = +10 \text{ msec.}$$

$N_1(t_1)$ and $D_1(t_1)$ are then computed using equations (6) and (7) as follows:

$$N_1 = \frac{[C_1 - \Delta S_1] + [C_{12} - \Delta S_{12}]}{2} = 13.5 \text{ ms.}$$

$$D_1 = \frac{[C_1 - \Delta S_1] - [C_{12} - \Delta S_{12}]}{2} = 1.5 \text{ ms.}$$

$\Delta S_N$ is computed using equation (13), repeated below:
$$\Delta S_N = C_N - \alpha_N D_1 - \alpha_N^2 N_1$$

Then, knowing $\Delta S_N$ and $C_N$, $D_N(t_1)$ and $N_N(t_1)$ are computed using equations (6) and (7). The results are shown in the following Table I. The normal moveout correction is even and the dip is odd, as demanded by the formulation.

TABLE I

| Trace No. | $a_N$ | $a_N^2$ | $a_N^2 N_1$ | $a_N D_1$ | $\Delta S_N$ | $\Delta S_N + a_N^2 N_1$ | |
|---|---|---|---|---|---|---|---|
| 1 | 1 | 1 | +10 | +14 | −2 | −2 | +12 msec. |
| 2 | 5/6 | 25/36 | +8 | +10 | −1 | −1 | +9 |
| 3 | 2/3 | 4/9 | 0 | +6 | −1 | −5 | −1 |
| 4 | 1/2 | 1/4 | −2 | +3 | 0 | −5 | −2 |
| 5 | 1/3 | 1/9 | 0 | +1 | 0 | −1 | 0 |
| 6 | 1/6 | 1/36 | −2 | 0 | 0 | −1 | −1 |
| 7 | −1/6 | 1/36 | 0 | 0 | 0 | 0 | 0 |
| 8 | −1/3 | 1/9 | 0 | +1 | 1 | −1 | 0 |
| 9 | −1/2 | 1/4 | +2 | +3 | 0 | −1 | +2 |
| 10 | −2/3 | 4/9 | −4 | +6 | +1 | −11 | −5 |
| 11 | −5/6 | 25/36 | −2 | +10 | +1 | −13 | −3 |
| 12 | −1 | 1 | +4 | +14 | +2 | −12 | +2 |

Finally, each of the records is corrected for the static correction and the normal moveout by applying the time correction given in the right-hand column of Table I. This produces records which retain the dip but are corrected for weathering, elevation differentials, and normal moveout.

It should be emphasized again that the operator used in the correlation operation should be from a good reflection portion of one of the center traces. If portions of the record are used where reflections are poor, the method is not reliable. A criterion may be established to eliminate erroneous values of normal moveout, which are obtained if an operator from a poor reflection portion of a record is used. If the correlation function maximum is below a given threshold, the normal moveout correction is not computed for that specific record time. In the example discussed above, the maximum values of the cross-correlation functions $\phi_{G,1}(j)$, $\phi_{G,12}(j)$ varied from 31 to 208 arbitrary units when three different operators were used. On the other hand, the fourth operator from a poor reflection portion of the record produced a cross-correlation function having a maximum of only 10 units. If the criterion had been established, for example, at 30 arbitrary units, the fourth operator would have been rejected as not being useful in determining normal moveout.

One technique for practicing the present invention is shown in the block diagram of FIG. 4a. With reference to this diagram, there will be described the manner in which a single trace, trace N, can be corrected for normal moveout and static corrections, thus producing a trace which retains the dip. First, an operator, which includes a good reflection from one of the center traces, is selected. This operator, NREF, is correlated against each of the end traces to obtain the total time shift of each of the end traces with respect to the reference trace. The operator NREF is correlated against the first end trace in correlator 401 to obtain $C_1(t)$. Similarly, the operator NREF is correlated against the other end trace, trace 12, in the correlator 402 to obtain $C_{12}(t)$ which is the total time shift of trace 12 with respect to the reference trace.

Since shotholes are located adjacent the geophones which produce both end traces and the reference trace, the static corrections for each of these traces can be obtained from uphole information obtained from an uphole detector adjacent each shothole. Therefore, the differential static corrections, $\Delta S_1$ and $\Delta S_{12}$, for each of the end traces are known. The differential static correction $\Delta S_1$ is subtracted from the trace time shift $C_1(t)$ in the subtractor 403. Similarly, $\Delta S_{12}$ is subtracted from the trace time shift $C_{12}(t)$ for the other end trace in the subtractor 404. The quantities $C_1(t)-\Delta S_1$ and $C_{12}(t)-\Delta S_{12}$ are combined to produce the normal moveout $N_1(t)$ and dip $D_1(t)$ in accordance with equations (6) and (7). The difference quantity $C_1(t)-\Delta S_1$ is equal to $D_1(t)+N_1(t)$, and the difference quantity $C_{12}(t)-\Delta S_{12}$ is equal to $D_{12}(t)+N_{12}(t)$. Since $D_1(t)$ is assumed to be equal to $-D_{12}(t)$ and since $N_1(t)$ is assumed to be equal to $N_{12}(t)$, the two quantities can be combined to determine $N_1(t)$ and $D_1(t)$. The two quantities are added together in adder 405 and divided by 2 in divider 406 to produce the normal moveout $N_1(t)$. The difference between the two quantities is taken in the subtractor 407, the output of which is divided by 2 in divider 408 to produce the dip $D_1(t)$.

In this manner, the dip and the normal moveout for each end trace has been obtained. In order to obtain the dip and normal moveout for the Nth trace, multipliers 409 and 410 are provided.

Since we have assumed that the dip is linear between the two end geophones, the dip for the end trace $D_1(t)$ can be extrapolated to the appropriate value for the Nth trace. Since the dip is linear, it is proportional to the distance from the Nth geophone to the center geophone, $X_N$, divided by the distance from the end geophone to the reference geophone, $X_1$. Therefore, in order to obtain $D_N(t)$, $D_1(t)$ is multiplied by $X_N/X_1$.

Similarly, the normal moveout for the Nth trace is proportional to $X_N^2/X_1^2$. Therefore, $N_1(t)$ is multiplied by $X_N^2/X_1^2$ in the multiplier 409 to obtain $N_N(t)$.

Having obtained $N_N(t)$ and $D_N(t)$, it is now possible to obtain the differential static correction $\Delta S_N$ for the Nth trace. In order to do this, the total time shift for the Nth trace must be found. Therefore, the operator NREF is correlated with trace N in the correlator 411 to obtain $C_N(t)$.

The sum of the normal moveout $N_N(t)$ and dip $D_N(t)$ is obtained in the adder 412. This sum is subtracted from the total time shift $C_N(t)$ in the subtractor 413 to obtain the differential static correction for the Nth trace $\Delta S_N$.

The differential static correction $\Delta S_N$ and the normal moveout $N_N(t)$ are applied to the Nth trace in the correction system indicated generally at 414.

Although the present invention preferably will be practiced on a digital computer, it will be understood from the foregoing description that the method may be carried out in various ways. For example, all of the components shown in block from in FIG. 4a are well known analog components. Reference to Korn and Korn, Electronic Analog Computers, second edition, 1956, McGraw-Hill Book Company, will disclose correlation function generators, adders, subtractors, and multipliers. The circuit 414 for applying static and normal moveout corrections to a trace may be of the magnetic drum type in which the heads are shifted by an amount proportional to the corrections to be applied. Such a system is shown, for example, in U.S. Pat. No. 3,075,172 to G. B. Loper et al.

Although the method may be carried out by analog techniques as discussed above, the preferred technique of carrying out the invention is by means of a digital computer. Such a technique will not be described in more detail.

A program may be written to perform the above calculations automatically on a digital computer. The program, in computing the total time correction $C_N(t)$, does the following as outlined briefly below:

1. The operator is selected from trace $x$ at time $t$. It is a cross-correlated with the operand from trace $y$, forming the function $\phi_{xy}^{(t)}(j)$.

$$\phi_{xy}^{(t)}(j) = \sum_{i=-8}^{8} X_{t+i} Y_{t+i+j}$$

The subscript $t$ indicates the operator time and the argument $j$ indicates the correlation time shift. The operator may be, for example, 16 samples (32 msec.) long. The operand length may be 96 samples long. Both the operator and operand are centered around $t$.

2. The maximum value of $\phi_{xy}^{(t)}(j)$, and the shift associated with the maximum ($j$) is computed. ($j$ may be either positive or negative shift.)

3. The operator is advanced to time $t+h$, where $h$ is the sampling interval, and steps (1) and (2) are repeated. This continues until time $t+Mh$.

In order to avoid errors in the normal moveout computation, it is necessary to apply a criterion based upon both maximum amplitude of the correlation function and possible values of normal moveout. For example, if a given shift $j_1$ is This instruction calculates the dip for the Jth trace as Alpha for the Jth trace multiplied by the dip for the first trace. This is in accordance with equation (10).

195  G(J)=ALPHA(J)**2*G(1)

ALPHA(J)**2 denotes that Alpha is squared. This instruction is a computation of the normal moveout for the Jth trace which is equal to ALPHA(J) squared multiplied by the normal moveout for the first trace.

200  ΔS(J)=CT(J)−D(J)−G(J)

This instruction computes the static correction for each trace in accordance with equation (13).

20  PRINT 25,ED,VSW,TU,ES, ZS,TU1,ES1,ZS1,TUN,ESN,ZSN

The parameters are printed out.

201  PRINT 202,JS,LW,NREF,N,DELT,

More parameters are printed in accordance with the format specified by instruction 202.

202  FORMAT (4H JS=110,4H LW=110,6H NREF=110,3H N=110,6H DELT=F10.5)

The format for the above printout.

205  PRINT 210,[ΔS(J),D(J),G(J),CT(J),CA(J),ALPHA(J),J,J=1,N]

The static correction, dip, normal moveout total time shift, and Alpha for each trace as specified by a J between 1 and N are printed out in accordance with the format specified by Instruction 210.

210  FORMAT (5X,1HS,9X,1HD,9X,1HG,9X,2H GT,8X,2HCA,5X,5 alpha,7X,1HJ)/(6F10.5,15)

The format for the above printout.

213  FORMAT (4F10.5,110)

Format information.

215  STOP 1234

Stop.

2200  END

This is the end of the main program.

SUBROUTINES

SUBROUTINE COROP (L,LA,B,C,JS,LW,KEY)

10  DIMENSION A(1000, B(1000, C(1000), P(1000)

This instruction specifies the array in storage for each of the four seismic traces.

12  BIG=0.

15  L21=2*LW+1

The length of the output, i.e., the number of samples in the correlation output, is equal to two times the length of the window plus one.

17  LOP=LW+1

The length of the operator is set equal to the length of the window plus one.

20  DO 30 I=1, LOP

This instruction initiates a "do loop" which selects an operator from the A array and inserts it into the P array. The operator begins at I=1 and ends when a number of samples has been put into the P array which number is equal to the length of the operator.

30  P(I)=A(I+JS−1)

This instruction is the second instruction in the "do loop" which includes instructions 20 and 30.

40  IF(KEY−1)50,50,300

The key number specifies what type of correlation is to be performed. If the key is 0, the operator is correlated against itself. If the key is 1, the operator is correlated against trace A. If the key is 2, the operator is correlated against an operator from trace B. If the key is 3, the operator from trace A is correlated against an operator from trace B. Accordingly, instruction 50 determines which portion of the correlation subroutine the computer is to proceed with when given a particular number. If the key number is less than 1, the computer proceeds with instruction 50. If the key number is 1, the computer proceeds with instruction 50. If the key number is more than 1, the computer proceeds with instruction 300.

50  IF(KEY)70,145,70

The computer arrives at instruction 50 in response to a determination that the key number is 0 or less than 1. If the key number is 0, the computer proceeds to instruction 145. Otherwise, the computer proceeds to instruction 70.

70  DO 95 K=1, L21

This instruction initiates a "do loop" which cross-correlates the operator against the trace contained in the A array in storage if a key number of 1 is specified.

75  SUM=0.

This instruction initially sets the sum equal to 0.

80  DO 85 I=1, LOP

This instruction initiates a "do loop" including instructions 80 to 85. This "do loop" performs the actual correlation steps of multiplying a sample from the P array and a sample from the A array and summing all of the products. The "do loop" continues until all samples in the operator and operand have been multiplied and summed.

90  C(K)=SUM

This instruction sets C(K) equal to the sum as determined by instruction 85.

95  BIG=MAX1F[ABSF C(K) , BIG]

This instruction finds the maximum amplitude of the correlation function.

96  BIGN=BIG/FLOATF(LOP)

The instructions 96–105 are normalizing subroutine instructions.

97  PRINT 98,BIGN

98  FORMAT (6H BIGN=E16.8)

99  BX=.9999/BIG

100  DO 105 K=1, L21

105  C(K)=C(K)*BX

115  FORMAT (10F8.4)

Format information.

120  RETURN

End of subroutine.

145  DO 175 K=1, LOP

150  SUM=0.

160  LK=LOP−K+1

165  DO 170 I=1, LK

| | |
|---|---|
| 166 | IK=I+K−1 |
| 170 | SUM=SUM+P(I)*P(IK) |

Instructions 145–170 are correlation operation instructions for KEY=0. This is autocorrelation of the operator against itself. These steps are the same as described in conjunction with instructions 70 to 95.

| | |
|---|---|
| 180 | BUG=C(1)/FLOATF(LOP) |
| 185 | PRINT 98,BUG |
| 190 | BUG=.9999/C(1) |
| 195 | DO 200 K=1, LOP |
| 200 | C(K)=C(K)*BUG |
| 211 | FORMAT (5E16.8) |
| 300 | IF(KEY−2)390,350,390 |
| 350 | JS1=JS−1 |
| 351 | DO 360 I=1, JS1 |
| 360 | B(I)=0 |
| 365 | JL1=JS+LW+1 |
| 370 | DO 380 I=JL1,LA |
| 380 | B(I)=0 |
| 390 | DO 400 I=1, LA |
| 400 | A(I)=B(I) |
| 410 | GO TO 70 |

This group of instructions, 300–410, performs the correlation specified by key number 2; i.e., the operator is correlated against an operator from trace B. If the key number is 2, the instruction 300 specifies that the computer jumps directly to instruction 390 and skips the intervening instructions 350 to 380. The key number 3 performs the correlation operation for an operator from trace A versus the complete trace B. The instructions 35–380 make the B array zero outside a particular window.

There will now be described a digital data-processing system which is capable of executing the foregoing instructions to produce the desired corrections. In FIG. 5 there is shown a diagrammatic representation of a data-processing system. This is a representation of most commonly available digital data-processing systems which include an input-output unit 20 for accepting input data 21 and for producing as an output reports indicated at 22. The digital data-processing system operates under control of instructions 23 which are fed into the computer through input-output unit 20. External data 21 and instructions 23 are stored in the computer internal storage unit 24. These data and instructions are processed by arithmetic unit 25 under control of the control unit 26 which operates in accordance with instructions 23.

There will now be described a particular digital computer which can be used in digitally processing the seismic data. However, it will be understood that the input-output units 20, internal storage unit 24, arithmetic unit 25 and control unit 26 can take many forms apart from those to be subsequently described.

In the computing system to be presently described, data 21 and instructions 23 are punched onto cards such as those shown in FIG. 6. In accordance with common practice, the seismic data is recorded in the field on magnetic tape. That is, the signals from each geophone are recorded on magnetic tape after the shot. The data on these magnetic tapes are automatically translated to digital codes. As shown schematically in FIG. 7, the magnetic tape 27 from the field is played back by pickup head 27a, the output of which is connected to analog-to-digital converter 28. The analog-to-digital converter 28 samples each of the seismic records at discrete sampling intervals and converts each of these samples to a digital code. The digital codes from analog-to-digital converter 28 are applied to a card punch 29 which automatically punches the digital codes onto cards of the type shown in FIG. 6. All of the equipment shown schematically in FIG. 7 is commercially available.

Commonly, each of the cards shown in FIG. 6 contains 80 vertical columns. Each of these columns contains spaces for punches which represent a digital code. The number of columns, or digital codes, which represent a particular item of information is referred to as the format. As an example, a commonly used format is 8F10.5. This specifies that each card contains eight floating point numbers of 10 columns each and that there is normally a decimal point before the last five digits. Referring to the cards of FIG. 6, the first 10 columns from the left represent a 10-digit number with each digit being specified by one vertical column punched digital code.

Referring now to FIG. 8, there is shown in block diagram form a digital computer. The input-output equipment includes a card reader 30 for converting each of the punched cards to electrical digital signals, and a translator 31 for translating each of the card codes to codes which are usable by the computer.

The internal storage unit of the computer includes the magnetic drum 32. This magnetic drum contains a plurality of storage bands, each of which is divided into a number of storage locations. Items of seismic data and instructions are stored in particular storage locations on magnetic drum 32.

The digital codes representing these items of data and instructions are gated into particular storage locations on the magnetic drum by the head switching control circuit 33. This head switching control circuit is a matrix switch operated by the control unit 34. This control unit includes an instruction register which contains a particular instruction which is to be executed. Each instruction includes an address portion and an operation portion. The address portion determines the storage location in the drum 32 to which or from which data is to be transferred. The address portion of the instruction is stored in address register 38 which acts over the control line 39 to operate the head switching control circuit 33 to gate the data to or from the proper storage location. The operation portion of the instruction is decoded in the decoder 36 which acts over numerous control lines to operate the digital computer.

Also included in control unit 34 is an instruction counter 40. Each time an instruction is performed, the instruction counter is advanced by one count. This instruction counter then acts through address register 38 and control line 39 to bring the next instruction from one of the storage locations on the magnetic drum to the instruction register to be performed. In this manner, the computer proceeds from instruction to instruction, executing each one in sequence.

In order to execute indexing cycles, or "do loops," an index register 42 and a comparator 43 are provided. In response to a specific instruction, the operation portion of this instruction will be performed repetitively on data from different consecutive storage locations. That is, if it is desired to add together data from ten consecutive storage locations, a single instruction can be performed repetitively with the index register 42 being advanced by one count upon each performance. When the index register indicates the specified number of repetitions, as determined by comparator 43, the repetition stops and the computer proceeds to the next instruction.

In order to perform arithmetical operations, the arithmetic unit 41 is provided. This arithmetic unit includes an accumulator 44 and an adder 45. All arithmetic operations can be performed by combinations of addition in the arithmetic unit 41.

established to be correct at time $t_1$ on the basis of large maxima in the correlation functions, then at a later time $t_2$, $j_2 \leq j_1$ because the NMO correction decreases with record time.

The complete program for performing the complete time corrections automatically is given below, followed by a brief description of the operation of a digital computer in performing exemplary ones of the instructions. The program below is written in a form which can be interpreted by most available general purpose or scientific computers. In particular, this program is suitable for use on a Control Data Corporation 1604 Computer. The program is written in a form which is referred to as FORTRAN. The computer has a special program which interprets the FORTRAN program and converts it to a form which is utilizable by the particular computer. A description of the statements used in this program is contained in FORTRAN System For The 1604 Computer, a publication of the Control Data Corporation and bearing Publication No. 087A.

Each of the instructions listed below is preformed in sequence by the computer. The instruction numbers are quite arbitrary and have been included only to provide a convenient way to refer to a particular instruction. While the instruction numbers could conveniently be set up in the same sequence as the instructions are performed, the arbitrary numbers which have been assigned the instructions in an actual program have been retained below.

The sequence of instructions to be performed in making the time corrections for a set of seismic records is given below:

10 READ 15, ED, VSW, TU, ES, ZS, TU1, ES1, ZS1, TUN, ESN, ZSN

Read the next card in the card reader and store the information in internal memory with a format specified by instruction 15. The information includes the values of ED, elevation of datum in feet; VSW, velocity of subweathering in feet per millisecond; TU, uphole time in milliseconds; ES; elevation of shot point in feet; ZS depth of shot in feet; TU1, uphole time at the shot point located at trace 1 in milliseconds; ES1, elevation of shot point located at trace 1, in feet; ZS1, depth of shot in shot point located at trace 1, in feet; TUN, uphole time at shot point located at trace N, in milliseconds; ESN, elevation of shot point located at trace N, in feet; ZSN, depth of shot in shot point located at trace N, in feet.

15 FORMAT (8F10.5)

This specifies the format of the numbers read from the card into internal memory as specified by instruction 10 above. In this case, the format (8F10.5) specifies that each card contains eight floating point numbers of 10 columns each and that there is normally a decimal point before the last five digits.

25 FORMAT (4H=F10.5,5H VSW=F10.5,4H TU=F10.5,4H ES=FIG. 5,4H ZS=F10.5,5H TU1=F10.5,5H ES1=F10.5,5H ZS1=F10.5,5H TUN=F10.5,5H ESN=F10.5,5H ZSN=F10.5)

This instruction specifies the output format of particular parameters that are printed out.

30 SZ=[TU+ES−ZS−ED]/VSW]*2

The time correction to be applied to the center, or reference, trace is computed in accordance with equation (2b). Note that $SZ=2t_{gd}$, which presumes that the records were previously shifted by $t_{up}$ to give surface-to-surface time.

35 ΔS(1)=[TU1+(ES1−ZS1−ED)/VSW]*2.−SZ

The differential static correction for the first trace, ΔS(1), is computed as the difference between the static correction for the first trace and the time correction for the center reference trace as computed by instruction 30.

50 READ 55,JS,LW,NREF,N,DELT

Read the information from the next card and store in internal storage the following information which has a format specified by instruction 55: JS, the sample number of first sample of correlation operator; LW, the number of samples in the correlation operator −1; NREF, reference trace number (traces numbered from 1 to N, beginning at one end trace and ending at the other end trace); N, number of traces on record; DELT, sampling interval in milliseconds.

55 FORMAT (4I10,F10.5)

The format of the above information is as follows: four fixed index numbers each of which is specified by 10 card columns, and a floating index number specified by 10 card columns with the decimal point before the last five digits.

40 ΔS(N)=[TUN+(ESN−ZSN−ED)/VSW]*2.−SZ

The calculation of the static correction for the N trace which is obtained by subtracting the time correction SZ from the time correction from the Nth trace.

65 CALL RECARD(A,AA,LA)

This instruction calls for the subroutine which begins with instruction 950. The subroutine reads the sample values for each of the seismic traces from the card or cards containing the samples into internal memory.

100 CALL EQUAL(A,LA,JS,LW)

This instruction initiates a subroutine which equalizes the amplitudes of each of the seismic traces. Since each seismic trace may be recorded with a different gain amplifier, it is desirable to normalize all traces to the same average absolute value to compensate for differences in recording gain.

101 JSL=JS+LW

This instruction computes the end JSL of the sampling operator, or window, which is equal to the sum of the beginning of the sampling interval, JS, plus the length of the sampling window, LW, both transferred from a card into memory by instruction 50.

102 DO 103 I=JS,JSL

This instruction initiates a "do loop" which includes the instructions 102 and 103. Instruction 102 specifies that the "do loop" is initiated at I=JS, the first sample in the operator. The "do loop" continues until I has been incremented until it is equal to JSL, the end of the window.

103 SS(I,NREF)=A(I)

This instruction stores the sample A(I) from the reference trace window into the seismic array SS at the proper place. If I is equal to JSL, the program proceeds to the next instruction, i.e., instruction 70. If I is not equal to JSL, there is a jump back to instruction 102 and another sample from the sample window is stored.

70 DO 160 J=1,N

This instruction initiates a "do loop" which includes all of the instructions between instruction 70 and instruction 160. This "do loop" determines the maximum value of the correlation between the operator window and the operand. The "do loop" is repeated for each of the operand traces. That is, the loop starts for trace 1, J=1, and proceeds for each trace until J=N.

75 IF(J−NREF)80,105,80

If J−NREF is negative, go to instruction 80. If J−NREF is zero, go to instruction 105. If J−NREF is positive, go to instruction 80.

80 CALL RECARD (B,AA,LB)

This instruction reads in the second trace from cards to storage.

85 CALL EQUAL (B,LB,JS,LW)

This is a subroutine which equalizes the trace just inserted into storage.

86  DO 87 I=JS, JSL

This instruction initiates a "do loop" which includes instruction 86 and 87. This "do loop" transfers sample values of the Jth seismic trace into the SS array, said samples being the operand in the first correlation operation. The samples of the operand between I=JS and I=JSL are stored.

87  SS(I,J)=B(I)

This instruction specifies that if the "do loop" has been repeated enough times to include all samples in the window, that is until I=JSL, then the computer proceeds to instruction 90. Otherwise, the computer returns to instruction 86 and repeats the storage of operand samples until a number of samples sufficient to encompass the length of the operand window have been stored.

90  CALL COROP(A,LA,B,C,JS,LW,3)

This instruction calls up a subroutine which correlates the operator with the operand. The correlation function is stored in a separate location in memory designated C(I).

110  LW2=2*LW+1

This instruction computes the total number of samples in the correlation function. This number is equal to two times the length of the window plus one.

125  CMAX=0

Set CMAX equal to 0. This is a reference.

130  DO 155 K=1, LW2

This instruction initiates a "do loop" which includes all of the instructions between instruction 130 and instruction 155. Instruction 130 continues the "do loop" (instruction 130–155) for a number of times from K=1 to K=LW2. That is, the computer continues searching for the maximum value of correlation from the first sample of the correlation function to the last sample of the correlation function.

135  IF (C(K)−CMAX)155,155,140

Subtract CMAX from the correlation function for the Kth sample, C(K). If the difference between C(K) and CMAX is negative, go to instruction 155. If the difference is zero, go to instruction 155. If the difference is positive, go to instruction 140.

140  CT(J)=FLOATF(K)*DELT

Store the time of the maximum correlation output for the Jth trace. The time in milliseconds, CT(J) is equal to the product of DELT, the sampling interval, and the floating function of K which is the sample value having maximum amplitude.

150  CMAX=C(K)

Set CMAX equal to C(K).

155  CONTINUE

This instruction specifies that the computer is to jump back to instruction 130 and complete another "do loop" if K is less than LW2. If K is equal to LW2, then the computer proceeds to the next instruction 160.

160  CA(J)=CMAX

This instruction sets CA(J) equal to the largest value of the correlation function for the Jth trace which has just been correlated against the operator window by means of the instructions included in the "do loop" including instructions 72 to 160. When instruction 160 is completed, the computer returns to instruction 70 to perform the "do loop" on another trace. If all traces have been correlated against the operator, the computer proceeds from instruction 160 to instruction 1161.

1161  NREF2=N−NREF+1

This instruction picks the index of the reference trace. N is the number of traces and NREF is the reference trace. NREF2 is the second reference trace which is obtained from a geophone which is on the other side of the shot point from the NREF trace and an equal distance from the shot point as is the NREF trace. (In FIG. 1, if NREF=6, then NREF2=7.)

9165  CT1=CT(NREF)

CT1 is set equal to the time of the maximum correlation for the reference trace.

9170  CT2=CT(NREF2)

CT2 is set equal to the time of the value of maximum correlation for the second reference trace.

1162  DO 1163 J=1, N

This instruction initiates a "do loop" including instructions 1162 and 1163 which determines the difference between the average of the correlation times for these two reference traces and the correlation time of the Jth trace.

1163  CT(J)=(CT1+CT2)/2.−CT(J)

This instruction finds CT(J), which is the trace correction in equation (3).

161  G(1)=[CT(1)−ΔS(1)+CT(N)−ΔS(N)]/2.

This instruction computes the normal moveout for trace 1, an end trace, in accordance with equation (6). In this instruction G(1) is the normal moveout of trace 1.

162  D(1)=[CT(1)−ΔS(1)−CT(N)+ΔS(N)]/2.

This is the computation of the dip for trace 1 obtained in accordance with equation (7).

162.5  PRINT

The values thus far computed are printed out.

163  FORMAT (6H G(1)=E16.8,6H D(1)=E16.8)

This gives the format for the characters which are printed out in accordance with the previous instruction.

165  N2=N/2

N2 is set equal to one-half of the total number of traces.

167  DO 200 J=1, N

This instruction initiates a "do loop" which includes all instructions between 167 and 200. This "do loop" calculates the dip and normal moveout for all traces between J=1, the end trace, and J=N, the other end trace.

170  IF(J−N2)175,185

This instruction specifies that for the traces on one side of the shot point, the computer proceeds to instruction 175 and for the traces on the other side, the computer goes to 185. This instruction is necessary since Alpha is positive for the traces on one side of the reference point and is negative for traces on the other side of the reference point. This occurs because Alpha is an odd function which specifies direction from the reference as particularly pointed out by equation (9).

175  ALPHA(J)=FLOATF(N2+1−J)/FLOATF(N2)

This instruction calculates Alpha for each trace. Alpha is positive for this calculation.

180  GO TO 190

This is a jump instruction which causes the computer to skip instruction 185 when the "do loop" is being performed for a trace which has a positive Alpha.

185  ALPHA(J)=FLOATF(N2−J)/FLOATF(N2)

This instruction computes the value of Alpha for those traces which require a negative Alpha.

190  D(J)=ALPHA(J)*D(1)

Finally, the output equipment of the computer includes a printer 46. The printer includes a decoder 47 for decoding digital codes transferred over the line 48 from one of the storage locations on the magnetic drum. The decoder 47 positions the print wheels 49 in accordance with the digital code which is being printed out. Print control motor 50 acts in response to the decoded portion of the print instruction to advance the mechanical linkage 51 so that the printout paper 52 engages the print wheels 49 to print the desired output code. Similarly, the column control motor 54 acts in response to the decoded print instruction to move the print wheel by one column after each printout.

Several operational features of the computing system of FIG. 8 will now be described. The operation of the computer in executing the following stored instructions is exemplary of the techniques used to process the seismic data:

1. The instruction READ 15,ED used to transfer data from the card reader to the storage locations, or addresses in internal storage of the computer;
2. The instruction JSL=JS+LW and similar instructions used to perform arithmetical operations on data stored in internal storage;
3. The instruction DO 103 I=JS,JSL and other instructions used in performing a "do loop";
4. The instruction PRINT 210,ΔS(J) used in printing out the computed corrections.

The first step in the performance of the instruction READ 15,ED is the translation of this instruction into a machine instruction by the aforementioned FORTRAN routine. This instruction specifies that the elevation data (known elevation of a particular geophone) is to be read from a card onto particular storage locations on magnetic drum 32. This data has a format specified by instruction 15. The instruction READ 15,ED is converted into a machine code which may be, for example, RC1 000. This machine code has an operation code portion RC1 which is decoded by decoder 36 and which acts over the control line 37 to enable the card reader 30 to read data from the next card. The address portion of the instruction, 000, specifies that data from the card is to be stored in consecutive storage locations on magnetic drum 32 beginning with the storage location 000. It should be noted that the FORTRAN routine automatically tabulates the storage locations in the magnetic drum 32 in which particular items of data are stored. Therefore, when it is desired to call up the elevation data for use in a computation, it is only necessary for the programmer to write an instruction containing the notation ED which is automatically translated into particular storage locations by the FORTRAN routine.

The cards which are punched to represent the seismic data by the equipment shown in FIG. 7 are stacked in the card reader 30, shown in FIG. 8. The cards in card reader 30 are read; that is, the digital codes are converted from a punch code to an electrical code in response to an instruction such as RC1 000. As each code from card reader 30 is read, the resultant electrical digital code is translated to a code usable by the computer in the translator 31. The resultant codes are applied to the head switching control 33 which feeds them into the proper storage location on the magnetic drum 32.

The machine instructions gate the digital codes to be stored through the head switching control 33 under control of the control unit 34. The instruction is stored in the instruction register 35 which forms a part of the control unit. The operation portion of the instruction register is decoded in decoder 36 which acts over control line 37 to cause the card reader 30 to read the next instruction. The address portion of the instruction is contained in address register 38 which acts over control line 39 to gate the digital codes from the translator 31 through the head switching control 33 to the proper storage location on the storage drum 32.

The instruction JSL=JS+LW is converted to machine instructions by the FORTRAN routine. This instruction computes the sampling interval JSL, which is the end of the sampling operator. The sampling interval JSL is equal to the sum of the beginning of the sampling interval JS and the length of the sampling window LW.

Assuming that JS is stored at storage location 100, LW is stored at storage location 101, and the sum JSL is to be stored at storage location 102, the FORTRAN routine converts the above instruction to the following three machine instructions:

```
CAA    100
ADD    101
STA    102
```

The instruction CAA 100 clears the accumulator 44 and adds the number from storage location 100, that is, JS, to the accumulator 44. The instruction ADD 101 adds the contents of storage location 101, JSL, to the accumulator 44. The instruction STA 102 stores the resultant sum in storage location 102.

The detailed steps in the performance of the instruction CAA 100 are as follows. The operation code CAA in instruction register 35 is decoded by decoder 36 which acts over control line 39 to gate the value of JS from storage location 100 through head switching control 33, over line 56, and through the adder 45 to the accumulator 44.

When this operation is performed, the instruction counter 40 is advanced by one count. The instruction counter 40 then specifies that the next instruction, ADD 101, is to be performed. This instruction is transferred through head switching control 33 to the instruction register 35. The operation portion is decoded by decoder 36 to cause the arithmetic unit 41 to add the number from storage location 101, LW, to the present contents of the accumulator JS. After the performance of this instruction, the instruction counter 40 is again advanced by one count and the next instruction, STA 102, is transferred to instruction register 35. This instruction causes the contents of accumulator 44, JSL, to be transferred over line 57, through head switching control 33, to storage location 102 on magnetic drum 32.

From the foregoing, it will be seen that arithmetic operations involving addition can be readily performed by simple computer instructions. Since all arithmetic operations can be performed by simple combination of addition, it will be understood that all of the arithmetic operations can be readily performed by suitable computer instructions.

As an example of the performance of a "do loop," consider the performance of the instructions 102 and 103:

| | | |
|---|---|---|
| 102 | DO 103 I=JS,JSL | This instruction initiates a "do loop" which includes the instructions 102 and 103. Instruction 102 specifies that the "do loop" is initiated at I=JS, the first sample in the operator. The "do loop" continues until I has been incremented until it is equal to JSL, the end of the window. |
| 103 | SS(I,NREF)=A(I) | |

These instructions store each sample value for each of the sample intervals in the operator window starting at the interval JS and ending at the interval JSL. These instructions are converted by the FORTRAN routine to the following machine instructions:

| | | |
|---|---|---|
| 500 | SIS 000 | Set index register to 0. |
| 501 | CAA 200 | Clear the accumulator and transfer to the accumulator the number at storage location 200 plus the contents of the index register. |
| 502 | STA 300 | Store the contents of the accumulator at storage location 300 plus the contents of the index register. |
| 503 | Inc 001 | Increment the index register by 1. |
| 504 | CIS 102 | compare the contents of the index register with the contents of storage location 102 which contains the number JSL. If the contents are unequal, proceed to the next instruction 505. If the contents are equal, skip one instruction and proceed to the instruction at storage location 506. |
| 505 | JMP 501 | Jump to the instruction at storage location 501. |

Assume that the samples to be stored in a particular array are contained in consecutive storage locations beginning at 200, and that a number of these samples equal to JSL are to be stored in consecutive storage locations beginning at storage location 300. The above instructions are performed in sequence with the first sample being transferred from storage location 200 to storage location 300. The index register 42 is incremented by one. The number in the index register is then compared with the contents of storage location 102 which contains the number JSL. Since the two are unequal, the computer jumps back to instruction 501, and another sample is stored. The transfer of samples continues until all the samples in the window have been transferred to consecutive storage locations beginning at 300. When this is accomplished, the number in the index register produces an equal comparison with JSL. The computer then exits from the "do loop" and proceeds with the next instruction 506.

The remaining component in the digital computer of FIG. 8 to be described is the output printer indicated generally at 46. Digital codes from storage are connected through head switching control 33 over the data line 48 to the amplifier 48a. The digital codes are decoded by positioning mechanism 47 which rotates the shaft 47a to set the print wheels 49 to the proper position corresponding with the digital code to be printed. The manner in which digital codes are translated to rotational movement to position printing wheels is well known to those skilled in the art.

The print wheels 49 are positioned to be brought into engagement with the printout paper 52. The paper 52 is brought into engagement with the print wheels 49 by means of the print motor 50.

The instruction PRINT 210 ΔS(J) is converted by the FORTRAN routine to a machine code PNT 650, wherein 650 specifies the storage location containing ΔS(J) which is a computed static correction. In response to the instruction PNT 650 which is decoded in decoder 36, the print control motor 50 is energized and rotates an incremental amount. The print control motor 50 rotates the notched wheel 51a to cause the tooth 51b to engage cam follower 51c on mechanical linkage 51d. When a tooth of notched wheel 51a engages the cam follower 51c, the mechanical linkage is rocked forward causing the arm 51e to push the printout paper 52 into engagement with the print wheels 49. Further rotation of the wheel 51a causes cam follower 51c to fall into a trough in the wheel thereby disengaging the printout paper 52 from print wheels 49.

Actuation of print motor 50 also rotates the printout paper 52 by means of the mechanical connection at 51f. After the printing of the digit has been completed, the paper 52 is incremented to the next position at which the printing is to occur.

Assume the instruction PNT 650 is in the instruction register 35. The address portion, 650, is transferred to address register 38. Address register 38 acts over control line 39 to set the head switching control 33 so that the contents of storage location 650 are transferred over line 48, through amplifier 48a to the decoder 47. The decoder 47 sets the print wheels 49 to the number specified by the contents of storage location 650. The Op. Code portion PHT of the instruction is decoded in decoder 36. In response to the instruction PHT the decoder 36 acts over control line 53 to actuate print control motor 50. Print control motor 50 rotates the notched wheel 51a to cause the printout paper 52 to be moved into engagement with print wheels 49 to print the number recorded in storage location 650. Further rotation of notched wheel 51a causes the record 52 to be moved out of engagement with the print wheels 49. Still further rotation of mechanical linkage 51f causes the moving record to be moved thereby incrementing the record to the next position which is to be printed.

From the foregoing description of the operation of the computer in performing several representative instructions, an understanding of the principles of digital computers can be obtained. Persons skilled in the art of programming the digital computer will readily understand the manner in which the complete program for seismic corrections can be performed on digital computers in accordance with the present invention.

The correlation technique described above can be extended to include reflection picking and grading. At any particular time $t_1$, the static and normal moveout corrections can be computed by using the cross-correlation technique above and the resulting time corrections applied to the cross-correlation functions thus obtained. The sum of cross-correlation functions can then be computed along various dip lines. The dip line having the largest sum then indicates the most probable value of the dip at time $t_1$ and the relative magnitude provides an indication of the grade of the reflection.

After the correlation functions, shown in FIg. 4, have been time-shifted in accordance with the $N_N$ plus $\Delta S_N$ corrections obtained by the cross-correlation technique described above, the cross-correlation functions appear as in FIG. 9. When the cross-correlation functions shown in FIG. 9 are added along dip lines, the curve shown at 101 in FIG. 10 results. This curve indicates that the most probable dip is about 3 milliseconds.

By using other reflection operators in making the cross-correlation corrections, the curves shown at 102, 103, and 104 in FIG. 10 are obtained. The curves 103 and 104 indicate a large cross-correlation value indicating that the operators used were good reflections. The curve 103 indicates that the operator used in making the computations for this curve contained a particularly good reflection. Conversely, since the curve 102 indicates a very low cross-correlation, a conclusion can be reached that it is in a no-reflection portion of the record.

After the reflections have been picked and graded and their most probable dip determined, they can be migrated and plotted on a dip section. This completes the automation procedure which starts with an uncorrected record and ends with a plotted dip section.

As another extension of the principles of this invention, it is possible to use a compositing technique in finding the total time lag for each trace by correlation techniques. In compositing, several seismic traces are added together to obtain a record in which the reflections are enhanced. As an example, the first four traces may be composited to obtain a single trace with enhanced reflections. The first trace is dropped from the composite and the fifth trace is added to obtain a second composite with enhanced reflections; the second trace is dropped and the sixth trace is added to obtain a third composite, and so on.

In applying this technique to the cross-correlation technique of finding the time lags for each trace, the first four traces are time-corrected from independent knowledge of what the time correction for each of these traces should be. The first four traces are then composited and correlated against the fifth trace to obtain the total time correction for the fifth trace. The fifth trace is corrected by this amount and added to the composite. The new composite is correlated against the sixth trace to obtain the time correction for this trace, and so on. Since the amount of dip in each of the total time corrections for the end traces is known, the static correction and normal moveout correction for the end traces can be computed. This is extrapolated to the center traces to obtain the dip for each of the center traces as in the previous technique.

While particular techniques have been shown in describing the principles of this invention, it will, of course, be understood that various modifications may be made without departing from the principles of the invention. The appended claims are, therefore, intended to cover any such modifications within the true spirit and scope of the invention.

I claim:

1. The method of operating computing apparatus to obtain static and normal moveout corrections for a set of seismic traces recorded from a plurality of geophone stations spaced along a traverse of the earth, each of said traces including seismic energy reflections modified by static and dynamic error, said set of traces including two traces for which the static error is known, a reference trace, and additional traces, said method comprising the steps of:

generating an electric signal representing a reflection operator from said reference trace, cross-correlating said electric signal representing said reflection operator against each trace of said set in the form of electric signals to produce electric signals representing the total time shift for each trace with respect to said reference trace, generating electrical signals representing the static corrections for said two traces, combining the electric signals representing total time shifts for both of said two traces with said electric signals representing the static corrections for each of said two traces to obtain the normal moveout and dip electric signals for at least one of said two traces, extrapolating the dip and normal moveout electric signals for said one of said two traces to the dip and normal moveout electric signals for each of the other traces, subtracting the dip and normal moveout electric signals for each trace from said electric signals representing the total time shift for each trace to obtain electric signals representing the static correction electric signals for each trace, and translating said normal moveout electric signals and said static correction electric signals into time corrections which for each said trace establish the time occurrence of said reflections absent the error modification.

2. The method recited in claim 1 wherein the step of cross-correlating said electric signal representing said reflection operator against each trace of said set in the form of electric signals to produce said electric signals representing the total time shift on each trace includes the steps of:

storing electric signals representing a plurality of amplitude values at sampling points on each trace, storing electric signals representing a plurality of amplitude values at sampling points on said operator, multiplying the value at each sampling point on said operator with the values at the corresponding sampling points on each of said traces, adding electric signals representing all products obtained in the aforementioned multiplying step to form one point in a cross-correlation function for each trace, shifting said operator with respect to each of said traces by successive time increments, repeating the aforesaid multiplying and adding steps at each of said time increments to form successive points in said cross-correlation function, and storing the time increment associated with the maximum value of said cross-correlation function as the total time shift for each trace.

3. The method recited in claim 1 wherein the step of extrapolating the dip and the normal moveout electric signals for said one trace to electric signals representing dip and normal moveout for each of the other traces includes multiplying the dip and the normal moveout electric signals for said one trace by electric signals which are functions of the distance from the geophone associated with each of said other traces to the geophone associated with the reference trace divided by the distance from the geophone associated with the reference trace to the geophone associated with said one trace.

4. The method of transforming a field seismogram to a seismic record free of normal moveout and static error, said field seismogram including first and second end traces from geophones at the respective ends of a spread, a reference trace from a geophone intermediate said end geophones, and selected seismic traces produced by the remaining geophones in said spread, which comprises:

translating said field seismogram into electrical signals representative of said end traces, said reference trace and a selected one of said traces, applying to a computing system at least a portion of said electrical signals representative of said reference trace, said end traces and said selected trace to cross-correlate said reference trace with said end traces and with said selected trace for production of a plurality of total time electric signals representing the total time shift between each of said end traces, said selected trace and said reference trace, subtracting first and second static correction electric signals from the total time electric signals for said first and second end traces respectively to generate first and second difference electric signals, adding said first and second difference electric signals to generate a moveout electric signal representing the normal moveout of said first end trace, subtracting said second difference electric signal from said first difference electric signal to generate a dip electric signal representing the dip of said first end trace, multiplying said moveout and said dip electric signals by electric signals proportional to a function of the ratio of the distance from the geophone producing said reference trace to the geophone producing said selected trace and the distance from the geophone producing said reference trace to the geophone producing said first end trace to produce electric signals representing the normal moveout and dip for said selected trace, subtracting said electric signals representing the normal moveout and dip from the total time electric signal for said selected trace to produce an electric signal representing the static correction for said selected trace, and time-shifting said selected trace of said field seismogram under control of said normal moveout and static correction electric signals to produce a seismic record free of normal moveout and static error.

5. The method recited in claim 4 wherein said electric signals comprise digital representations of physical quantities, the individual digits of said digital representations being represented by variations in discrete steps of an electrical quantity.

6. The method recited in claim 4 wherein said electric signals comprise analog representations of physical quantities, the magnitude of each of said physical quantities being represented by continuous variations in the magnitude of an electrical quantity.

7. The method recited in claim 4 wherein the step of applying to a computing system at least a portion of said electric signals representative of said reference trace, said end traces and said selected trace to cross-correlate said reference trace with said end traces and with said selected trace for production of said total time electric signals includes the steps of:

storing a plurality of amplitude values at sampling points on each trace, storing a plurality of amplitude values at sampling points on said portion, multiplying the value at each sampling point on said portion with the values at the corresponding sampling points on each of said traces, adding all products obtained in the aforementioned multiplying step to form one point in a cross-correlation function for each trace, shifting said portion with respect to each of said traces by successive time increments, repeating the aforesaid multiplying and adding steps at each of said time increments to form successive points in said cross-correlation function, and storing the time increment associated with the maximum value of said cross-correlation functions as the total time shift for each trace.

8. The method recited in claim 7 further including reflection picking and grading comprising the steps of:

time-correcting the cross-correlation function for each trace by an amount equal to the normal moveout plus the static correction for that trace, time-shifting each of the time-corrected cross-correlation functions by increments of time corresponding with the dip between adjacent traces for each of a plurality of assumed dip lines, adding together time-shifted corrected cross-correlation functions to obtain a sum for each assumed dip line, and storing the dip of the dip line having the largest sum, the dip associated with this dip line providing an indication of the most probable value of dip, the magnitude of the sum providing an indication of the grade of reflection.

9. The method recited in claim 4 wherein said multiplying step includes:

multiplying said moveout electric signal by an electric signal proportional to the ratio of the square of the distance from the geophone producing said reference trace to the geophone producing said selected trace and the square of the distance from the geophone producing said reference trace to the geophone producing said first end trace to produce an electric signal representing the normal moveout correction for said selected trace, and multiplying said dip electric signal by an electric signal proportional to the ratio of the distance from the geophone producing said reference trace to the geophone producing said selected trace and the distance from the geophone producing said reference trade to the geophone producing said first end trace to produce an electric signal representing the dip for said selected trace.

10. The method recited in claim 4 further including:

compositing a selected number of consecutive traces after each of said consecutive traces has been time-shifted by an amount equal to the total time shift to produce a single trace with enhanced reflections, cross-correlating a portion of said single trace with the next consecutive trace to generate a total time electric signal for said next consecutive trace, compositing said selected number of traces including said next consecutive trace, and repeating said compositing and cross-correlating steps by adding the next consecutive trace and dropping the first trace of said selected number from said composite each time said compositing operation is performed.

11. The method of time-correcting a particular record in a set of records representing time variable physical quantities obtained from a sequence of spaced points including two end points and a reference point intermediate said end points, said records each having a total time shift with respect to the reference record obtained from said reference point, said total time shift having the following components:

a static component varying randomly from record to record and being known for the first and second end records obtained from said end points, a moveout component varying from record to record as an even function of the square of the distance between said reference point and the point at which said record was obtained, a dip component varying from record to record as an odd linear function of the distance between said reference point and the point at which said record was obtained, said method comprising the steps of:

applying each of said records to a correlator to cross-correlate each of said records with said reference record to generate a plurality of total time shift electric signals representing the total time shift between each record and said reference record, subtracting electric signals representing the known static components for said first and second end records from the total time shift electric signals for said first and second end records respectively to generate first and second difference electric signals representing the dip and normal moveout components for said first and second end records, adding said first and second difference electric signals to generate a moveout electric signal representing the normal moveout of said first end record, subtracting said second difference electric signal from said first difference electric signal to generate a dip electric signal representing the dip of said first end record, multiplying said moveout electric signal by an electric signal proportional to the ratio of the square of the distance from said reference point to the point at which said particular record was obtained and the square of the distance from said reference point to one of said end points to produce an electric signal representing the moveout component for said particular record, multiplying said dip electric signal by an electric signal proportional to the ratio of the distance from said reference point to the point at which said particular record was obtained and the distance from said reference point to one of said end points to produce an electric signal representing the dip component for said particular record, subtracting the electric signals representing the moveout and dip components for said particular record from the total time shift electric signal for said particular record to produce an electric signal representing the static component for said particular record, and time-shifting said particular record by an amount equal to said moveout component plus said static components.

12. The method recited in claim 11 wherein said electric signals comprise digital representations of physical quantities, the individual digits of said digital representations being represented by variations in discrete steps of an electrical quantity.

13. The method recited in claim 11 wherein said electric signals comprise analog representations of physical quantities, the magnitude of each of said physical quantities being represented by continuous variations in the magnitude of an electrical quantity.

14. The method recited in claim 1 wherein the step of combining the total time shifts for said two traces and the static corrections for said two traces includes the steps of:

subtracting the electric signal representing the static correction for one trace of said two traces from the electric signal representing the total time shift for said one trace to produce a first difference electric signal, subtracting the electric signal representing the static correction for the other trace of said two traces from the electric signal representing the total time shift for said other trace to produce a second difference electric signal, adding said first and said second difference electric signals to obtain the normal moveout electric signal for said one trace, and subtracting said second difference electric signal from said first difference electric signal to produce the dip electric signal for said one trace.

15. In seismic exploration wherein a field seismogram is transformed to a seismic record free of normal moveout and static error, said field seismogram including first and second end traces from geophones at the respective ends of a spread, a reference trace from a geophone intermediate said end geophones and selected seismic traces produced by the remaining geophones in said spread, the method of operating a digital computer, said computer including:

an input unit for transforming said traces to electric signals in a form which can be utilized by said computer, a storage unit for storing said electric signals, an arithmetic unit for operating upon said electric signals, and an output unit for transforming said electric signals into time corrections for said traces, said method comprising:

transferring from said storage unit to said arithmetic unit an electric signal representing a reflection operator from said reference trace,
successively transferring from said storage unit to said arithmetic unit electric signals representing each trace,
successively cross-correlating in said arithmetic unit said electric signals representing said reflection operator against each trace to produce electric signals representing the total time shift for each trace with respect to said reference trace,
transferring from said storage unit to said arithmetic unit electric signals representing the static corrections for said first and second end traces,
combining in said arithmetic unit the electric signals representing total time shifts for both of said end traces with said electric signals representing the static corrections for each of said end traces to obtain the normal moveout and dip electric signals for at least one of said end traces,
transferring from said storage unit to said arithmetic unit an electric signal representing the distance from the geophone producing said reference trace to the geophone producing a selected trace and an electric signal representing the distance from the geophone producing said reference trace to the geophone producing said first end trace,
extrapolating in said arithmetic unit the dip and normal moveout electric signals for said one of said end traces to the dip and normal moveout electric signals for said selected trace, said extrapolating being performed in proportion to the ratio of the two electric signals representing distance,
subtracting in said arithmetic unit the dip and normal moveout electric signals for said selected trace from said electric signal representing the total time shift for said selected trace to obtain an electric signal representing the static correction electric signal for said trace, and
transferring said normal moveout electric signal and said static correction signal to said output unit for translation into time corrections which establish the time occurrence of the seismic energy reflections absent error modification on said selected trace.

* * * * *

UNITED STATES PATENT OFFICE
CERTIFICATE OF CORRECTION

Patent No. 3,648,227      Dated March 7, 1972

Inventor(s) Raymond L. Sengbush

It is certified that error appears in the above-identified patent and that said Letters Patent are hereby corrected as shown below:

Column 5, line 37, "fro" should read --for--; and
        line 45, the formula should read as follows:
$$C_N(t_1)$$
Column 6, line 34, "$C_1(t$" should read -- $C_1(t)$ --.
Column 7, lines 3 and 4, the heading for Table I should appear as follows:

| Trace No. | $\alpha_N$ | $\alpha_N^2$ | $\hat{j}_N^2$ | $\alpha_N^2 N_1$ | $\alpha_N D_1$ | $\Delta S_N$ | $\Delta S_N + \alpha_N^2 N_1$ |
|---|---|---|---|---|---|---|---| line 12, in Table I under the heading "$\alpha_N D_1$" for Trace No. 8, "1" should read -- 0 --;
        line 34, the formula should read
$$\emptyset_{6,1}(j), \emptyset_{6,12}(j)$$
        line 68, "$N_1(t$" should read -- $N_1(t)$ --.
Column 8, line 34, "from" should read --form--;
        line 47, "not" should read --now--;
        line 52, after "It is" cancel "a"; and
        line 61, "subscript" should read --superscript--.
Column 9, line 3, that portion of the formula reading
        $j_2$ should read $\hat{j}_2$
        line 19, "preformed" should read --performed--;
        line 55, that portion of instruction 25 reading
        ES=FIG. 5,4H should read ES=F10.5,4H
        line 61, that portion of instruction 30 reading
        [TU+ES-ZS-ED) should read [TU+(ES-ZS-ED)
Column 11, line 4 and line 35, "instruction" should read --instructions--.
Column 13, line 36, that portion of instruction 210 reading
        5 alpha should read 5H ALPHA
        line 46, "2200" should read -- 220 --.
Column 14, line 45, that portion of instruction 95 reading
        [ABSF C(K) ,BIG] should read [ABSF$($C(K)$)$,BIG]

UNITED STATES PATENT OFFICE
CERTIFICATE OF CORRECTION

Patent No. 3,648,227　　　　　　　　　Dated March 7, 1972

Inventor(s) Raymond L. Sengbush

It is certified that error appears in the above-identified patent and that said Letters Patent are hereby corrected as shown below:

Column 15, line 21, insert --The Instructions 180-211 normalize the correlation function.--; and
　　　　　　line 48, "35-380" should read -- 351-380 --.
Column 18, line 68, "Inc 001" should read -- INC 001 --;
　　　　　　line 69, "compare" should read --Compare--; and
　　　　　　line 77, insert -- 506 -- on the left-hand side under the listing of instruction numbers.
Column 21, line 2, before "steps" insert --following--; and after "steps" cancel "of" and insert --each executed by automatic computing apparatus--;
　　　　　　line 72, cancel "which comprises" and insert --said method comprising the following steps each executed by automatic computing apparatus--.
Column 23, line 67, before "steps" insert --following--; and after "steps" cancel "of" and insert --each executed by automatic computing apparatus--.
Column 24, line 60, through Column 26, line 21, cancel claim 15.

Signed and sealed this 1st day of August 1972.

(SEAL)
Attest:

EDWARD M. FLETCHER, JR.　　　　　ROBERT GOTTSCHALK
Attesting Officer　　　　　　　　　Commissioner of Patents

UNITED STATES PATENT OFFICE
CERTIFICATE OF CORRECTION

Patent No. 3,648,227                  Dated    March 7, 1972

Inventor(s)    Raymond L. Sengbush

It is certified that error appears in the above-identified patent and that said Letters Patent are hereby corrected as shown below:

In the heading of Column 1 of the title page, insert

-- [73] Assignee: Mobil Oil Corporation --.

Signed and sealed this 20th day of March 1973.

(SEAL)
Attest:

EDWARD M. FLETCHER, JR.
Attesting Officer

ROBERT GOTTSCHALK
Commissioner of Patents